(12) United States Patent
Hill

(10) Patent No.: US 9,812,753 B2
(45) Date of Patent: Nov. 7, 2017

(54) RADIOFREQUENCY AND OTHER ELECTRONIC DEVICES FORMED FROM ENHANCED RESONANT FREQUENCY HEXAFERRITE MATERIALS

(71) Applicant: SKYWORKS SOLUTIONS, INC., Woburn, MA (US)

(72) Inventor: Michael D. Hill, Frederick, MD (US)

(73) Assignee: Skyworks Solutions, Inc., Woburn, MA (US)

(*) Notice: Subject to any disclaimer, the term of this patent is extended or adjusted under 35 U.S.C. 154(b) by 1170 days.

(21) Appl. No.: 13/925,142

(22) Filed: Jun. 24, 2013

(65) Prior Publication Data
US 2013/0285874 A1 Oct. 31, 2013

Related U.S. Application Data

(62) Division of application No. 13/314,106, filed on Dec. 7, 2011, now Pat. No. 8,609,062.
(Continued)

(51) Int. Cl.
*H01B 1/08* (2006.01)
*H04B 1/00* (2006.01)
(Continued)

(52) U.S. Cl.
CPC ......... *H01P 1/397* (2013.01); *C01G 49/0036* (2013.01); *C01G 51/40* (2013.01);
(Continued)

(58) Field of Classification Search
CPC ... H01B 1/00; H01B 1/08; H04B 1/00; H04B 1/38; H04M 2201/08
See application file for complete search history.

(56) References Cited

U.S. PATENT DOCUMENTS 6,761,839 B2* 7/2004 Wang ................. C01G 49/0036
252/519.51
6,893,581 B2* 5/2005 Umemoto ............. B82Y 30/00
252/62.56
(Continued)

FOREIGN PATENT DOCUMENTS

JP 2003-221232 8/2003

OTHER PUBLICATIONS

Temuujin et al "Benefits of mild wet milling of the intermediates for the synthesis of phase-pure Z-type hexaferrite", J. Mater. Res., vol. 20, No. 8, Aug. 2005 pp. 1939-1942.*
(Continued)

*Primary Examiner* — Mark Kopec
(74) *Attorney, Agent, or Firm* — Knobbe Martens Olson and Bear LLP

(57) ABSTRACT

Radiofrequency and other electronic devices can be formed from textured hexaferrite materials, such as Z-phase barium cobalt ferrite $Ba_3Co_2Fe_{24}O_{41}$ ($Co_2Z$) having enhanced resonant frequency. The textured hexaferrite material can be formed by sintering fine grain hexaferrite powder at a lower temperature than conventional firing temperatures to inhibit reduction of iron. The textured hexaferrite material can be used in radiofrequency devices such as circulators or telecommunications systems.

20 Claims, 8 Drawing Sheets

Related U.S. Application Data

(60) Provisional application No. 61/420,625, filed on Dec. 7, 2010, provisional application No. 61/435,608, filed on Jan. 24, 2011.

(51) Int. Cl.

| | | |
|---|---|---|
| *H01P 1/00* | (2006.01) | |
| *H01P 1/397* | (2006.01) | |
| *H04B 1/38* | (2015.01) | |
| *C04B 35/64* | (2006.01) | |
| *H01Q 1/50* | (2006.01) | |
| *C04B 35/26* | (2006.01) | |
| *C04B 35/624* | (2006.01) | |
| *C04B 35/626* | (2006.01) | |
| *H01F 1/34* | (2006.01) | |
| *C01G 49/00* | (2006.01) | |
| *C01G 51/00* | (2006.01) | |

(52) U.S. Cl.
CPC ............ *C04B 35/26* (2013.01); *C04B 35/624* (2013.01); *C04B 35/6261* (2013.01); *C04B 35/62625* (2013.01); *C04B 35/64* (2013.01); *H01B 1/08* (2013.01); *H01F 1/348* (2013.01); *H01Q 1/50* (2013.01); *H04B 1/38* (2013.01); *C01P 2004/61* (2013.01); *C01P 2006/12* (2013.01); *C04B 2235/3201* (2013.01); *C04B 2235/3215* (2013.01); *C04B 2235/3275* (2013.01); *C04B 2235/3277* (2013.01); *C04B 2235/5445* (2013.01); *C04B 2235/604* (2013.01); *C04B 2235/6021* (2013.01); *C04B 2235/6562* (2013.01); *C04B 2235/6565* (2013.01); *C04B 2235/6567* (2013.01); *C04B 2235/767* (2013.01)

(56) References Cited

U.S. PATENT DOCUMENTS

| | | |
|---|---|---|
| 7,133,189 B2 | 11/2006 | Ohido et al. |
| 2007/0138432 A1 | 6/2007 | Minachi et al. |
| 2007/0264942 A1* | 11/2007 | Wu ............ H03F 1/0205 455/73 |
| 2008/0101979 A1 | 5/2008 | Kato et al. |
| 2009/0297432 A1 | 12/2009 | Hill |

OTHER PUBLICATIONS

Zhuravlev et al "Influence of the mechanical activation modes on the structure parameters and magnetic properties of Z-type hexaferrite BA3Co2.4Ti0.4Fe23.2O41 nanopowders", Russian Physics Journal, vol. 51, No. 9, 2008 pp. 902-06.*

M. Matters-Kammerer et al "Material Properties and RF Applications of high k and ferrite LTCC Ceramics", Microelectronics Reliability 46 (2006) 134-143.*

Zaspalis et al "Materials for inductive and microwave function integration in LTCC-technology multichip modules", Journal of Physics: Conference Series 10 (2005) 357-360.*

* cited by examiner

RADIOFREQUENCY AND OTHER ELECTRONIC DEVICES FORMED FROM ENHANCED RESONANT FREQUENCY HEXAFERRITE MATERIALS

INCORPORATION BY REFERENCE TO ANY PRIORITY APPLICATIONS

This application is a divisional of U.S. patent application Ser. No. 13/314,106, filed Dec. 7, 2011, now U.S. Pat. No. 8,609,062, which claims the benefit of U.S. Provisional Application No. 61/420,625, filed Dec. 7, 2010, and U.S. Provisional Application No. 61/435,608, filed Jan. 24, 2011, the disclosure of each of which is hereby incorporated by reference in its entirety.

BACKGROUND OF THE INVENTION

Field of the Invention

Embodiments of the invention relate to methods of preparing compositions and materials useful in electronic applications, and in particular, useful in radio frequency (RF) electronics.

Description of the Related Art

Magneto-dielectric materials are particularly useful in RF devices such as antennas, transformers, inductors, and circulators. Recent advances in magneto-dielectric materials are driven in part by the need to miniaturize high frequency antennas while maintaining desirable bandwidth, impedance, and low dielectric loss. It is also desirable to increase the upper frequency limit of an antenna, which is largely determined by the resonant frequency of the material used.

Hexagonal ferrites such as Z-phase barium cobalt ferrite ($Ba_3Co_2Fe_{24}O_{41}$), commonly abbreviated as $Co_2Z$, are magneto-dielectric materials often used in high frequency antennas and other RF devices. To improve the performance characteristics of $Co_2Z$ and other hexagonal ferrites, prior art methods are largely focused on substituting certain chemical elements in $Co_2Z$ with others. For example, one such method involves doping $Co_2Z$ with small amounts of an alkali metal such as potassium (K), sodium (Na), or rubidium (Rb) to improve the magnetic permeability of the material at high frequencies, which in turn increases the useable frequency range. However, these chemical substitution solutions are met with moderate success. As such, there is a continuing need to improve the material properties and performance characteristics of magneto-dielectric materials such as $Co_2Z$ for RF applications.

SUMMARY OF THE INVENTION

The compositions, materials, methods of preparation of this disclosure each have several aspects, no single one of which is solely responsible for its desirable attributes. Without limiting the scope of this invention, its more prominent features will now be discussed briefly.

Certain embodiments of the invention provide a method of increasing the resonant frequency of hexagonal ferrite materials. In one embodiment, the method comprises forming a fine grain hexagonal ferrite powder in a desired phase and firing the hexagonal powder at a low temperature, preferably lower than standard sintering temperatures for the particular material. In some embodiments, the method further comprises compacting the hexagonal ferrite powder before firing. In one implementation, the hexagonal powder is fired at a temperature between about 1100° C. to 1250° C. In another implementation, the hexagonal ferrite powder has an average particle size of less than 1 micron, preferably between about 300 nm-600 nm. In yet another implementation, the hexagonal ferrite powder has a surface area of greater than about 6 $m^2/g$, preferably greater than about 15 $m^2/g$. The resulting material is preferably a fine grained hexagonal ferrite material having a density in the range of about 70%-100% of the theoretical density. The processing techniques cause the hexagonal ferrite material to have reduced magnetorestriction, which increases the resonant frequency of the material and, in turn, results in higher frequency values for antenna applications.

The hexagonal ferrite materials can include Z type hexagonal ferrites such as $MI_3MII_2Fe_{24}O_{41}$, Y type hexagonal ferrites such as $MI_2MII_2Fe_{12}O_{22}$, W type hexagonal ferrites such as $MIMII_2Fe_{16}O_{27}$, U type hexagonal ferrites such as $MI_4MII_2Fe_{36}O_{60}$, X type hexagonal ferrites such as $MI_2MII_2Fe_{28}O_{46}$, and M type hexagonal ferrites such as $MIFe_{12-2x}MIIxMIII_xO_{19}$, wherein MI is barium (Ba) or strontium (Sr), and MII is a divalent metal such as cobalt (Co), zinc (Zn), nickel (Ni), magnesium (Mg), Manganese (Mn), or copper (Cu), MIII is a tetravalent metal such as titanium (Ti), zirconium (Zr), tin (Sn), germanium (Ge), silicon (Si), cerium (Ce), praseodymium (Pr), or hafnium (Hf).

Advantageously, the preferred embodiments of the invention provide a method to produce fine grain hexagonal ferrite materials having reduced magnetorestriction and increased resonant frequency without modifying the chemical composition of the hexagonal ferrite. However, in some embodiments, intergrowths between different phases of materials can apply. Small amounts of dopants such as potassium (K), sodium (Na), rubidium (Rb), or calcium (Ca) can also be added to the hexagonal ferrite further modify the properties.

DETAILED DESCRIPTION OF THE PREFERRED EMBODIMENT

Magnetic materials are preferred in high frequency applications such as antennas, transformers, inductors, circulators, and absorbers because of certain favorable material properties. Some of the desirable properties afforded by magnetic materials are favorable miniaturizing factors, reduced field concentration, and better impedance match. Hexagonal ferrite systems, in particular, are desirable because of their high magnetic permeability and absorption at microwave (100 MHz-20 GHz) frequencies. Hexagonal ferrite systems include crystal structures that are generally intergrowths between magnetoplumbite and spinel structures containing barium (Ba) or strontium (Sr), a divalent cation such as iron (Fe), cobalt (Co), nickel (Ni) or manganese (Mn) and trivalent Fe. The hexagonal ferrite may be formed in a variety of different crystal structures based on the magnetoplumbite cell. These structures include M-phase ($BaFe_{12}O_{19}$), W-phase ($BaMe_2Fe_{16}O_{27}$), Y-phase ($Ba_2Me_2Fe_{12}O_{22}$) and Z-phase ($Ba_3Me_2Fe_{24}O_{42}$).

Figure 1:
FIG. 1 illustrates the microstructures of $Co_2Z$ of one embodiment at 500× magnification.

Embodiments of the present invention disclose methods and processing techniques for improving performance characteristics of hexagonal ferrite materials used in high frequency applications. Certain preferred embodiments provide improved methods and processing techniques for manufacturing Z-phase hexagonal ferrite systems $Ba_3Co_2Fe_{24}O_{42}$ ($Co_2Z$) that have reduced magnetorestriction, improved resonant frequency, and extended magnetic permeability at higher frequencies. FIG. 1 illustrates the microstructures of $Co_2Z$ of one embodiment at 500× magnification.

Relative permeability and relative permittivity are properties indicative of the performance of a magnetic material in high frequency applications. Relative permeability is a measure of the degree of magnetization of a material that responds linearly to an applied magnetic field relative to that of free species ($\mu_r = \mu/\mu_o$). Relative permittivity ($\in_r$) is a relative measure of the electronic polarizability of a material to the polarizability of free species ($\in_r = \in/\in_o$). Generally, permeability ($\mu'$) can be separated into two components: spin rotational $X_{sp}$ which is in response for high frequency, and domain wall motion $X_{dw}$ which is damped out at microwave frequencies. Permeability can be generally represented by $\mu' = 1 + X_{dw} + X_{sp}$.

Unlike spinels, $Co_2Z$ systems typically have a non-cubic unit cell, planar magnetization, and an anisotropic spin-rotation component to permeability. Spin rotation anisotropy is also a consideration in preparing $Co_2Z$ for high frequency applications. Large anisotropy fields ($H_\theta$) are similar to applying an external magnetic field which increases resonant frequency, whereas small anisotropy fields ($H_\phi$) improve permeability. $H_\theta$ is generally strong in hexagonal ferrites, such as $Co_2Z$. As such, domain formation out of the basal plane is suppressed and the material becomes self-magnetizing. The relationship between permeability and rotational stiffness can be represented by the formula $(\mu_o-1)/4\pi = (1/3)(M_s/H_\theta^A + M_s/H_\phi^A)$. For isotropic rotational stiffness in connection spinels and c-axis oriented hexagonal ferrites, the relationship can be represented as follows: $(\mu_o-1)/4\pi = (2/3)(M_s/H^A)$. For cases where $H_\theta^A$ does not equal to $H_\phi^A$:$f_{res}$ $(\mu_o-1) = 4/3 \, \psi M_s \, [1/2 \, (H_\theta^A/H_\phi^A) + 1/2 \, (H_\phi^A/H_\theta^A)]$. It is believed that the larger the difference in rotational stiffness, the greater the self magnetization field and the greater the resonant frequency, which could push the resonant frequency into the microwave region. Permeability drops quickly above resonance frequency.

Certain aspects of the present disclosure provide processing techniques for increasing the permeability of $Co_2Z$ at higher frequencies. In one implementation, the processing techniques involve methods of magnetic texturing of $Co_2Z$ to result in a textured $Co_2Z$ with improved magnetic properties. In one embodiment, the method of magnetic texturing used in forming $Co_2Z$ involves using a reaction sintering method, which includes the steps of aligning M-phase ($BaFe_{12}O_{19}$ uniaxial magnetization) with non-magnetic additives in a static magnetic field and reacting with BaO source and CoO to form Z-phase ($Ba_3Me_2Fe_{24}O_{42}$). In another embodiment, the method of magnetic texturing used in forming $Co_2O$ involves using a rotating magnetic field method, which includes the steps of aligning $Co_2Z$ phase (planar magnetization) with magnetic texturing occurring in a rotating magnetic field. The inventor has found that the degree of alignment, thus permeability gain, is far superior in a rotating magnetic field.

In some embodiments, the processing technique for forming $Co_2Z$ includes making Z phase Fe deficient to inhibit reduction of Fe as the inventor believes that dielectric and magnetic loss is increased by reduction of Fe ($Fe^{3+} \rightarrow Fe^{2+}$) at high temperatures. The processing technique includes the step of heat treatment or annealing in oxygen to inhibit reduction of Fe and cause $Fe^{2+} \rightarrow Fe^{3}$. In other embodiments, the processing technique includes doping the $Co_2Z$ with additives such as potassium and alkali metals to increase the resonance frequency, and hence increase Q at higher frequency ranges.

In some other embodiments, the processing technique for forming $Co_2Z$ includes forming fine grain hexagonal ferrite particles. The process involves using high energy milling to reduce the particle size. The following chart shows that in one embodiment, high energy milling is used to produce $Co_2Z$ particle size in the range of 0.2 to 0.9 microns and surface area of 8-14 $m^2/g$. In this embodiment, the firing temperature is preferably 1150 to 1250° C.

| Process | Particle Size | Surface Area | Firing Temp. | Grain Size (Intercept Method) |
|---|---|---|---|---|
| Standard Milling | D50 = 1-5 microns | 1-3 $m^2/g$ | 1250-1350° C. | 10-30 microns |
| High Energy Milling | D50 = 0.2-0.9 microns | 8-14 $m^2/g$ | 1150-1250° C. | 2-15 microns |

Figure 2:
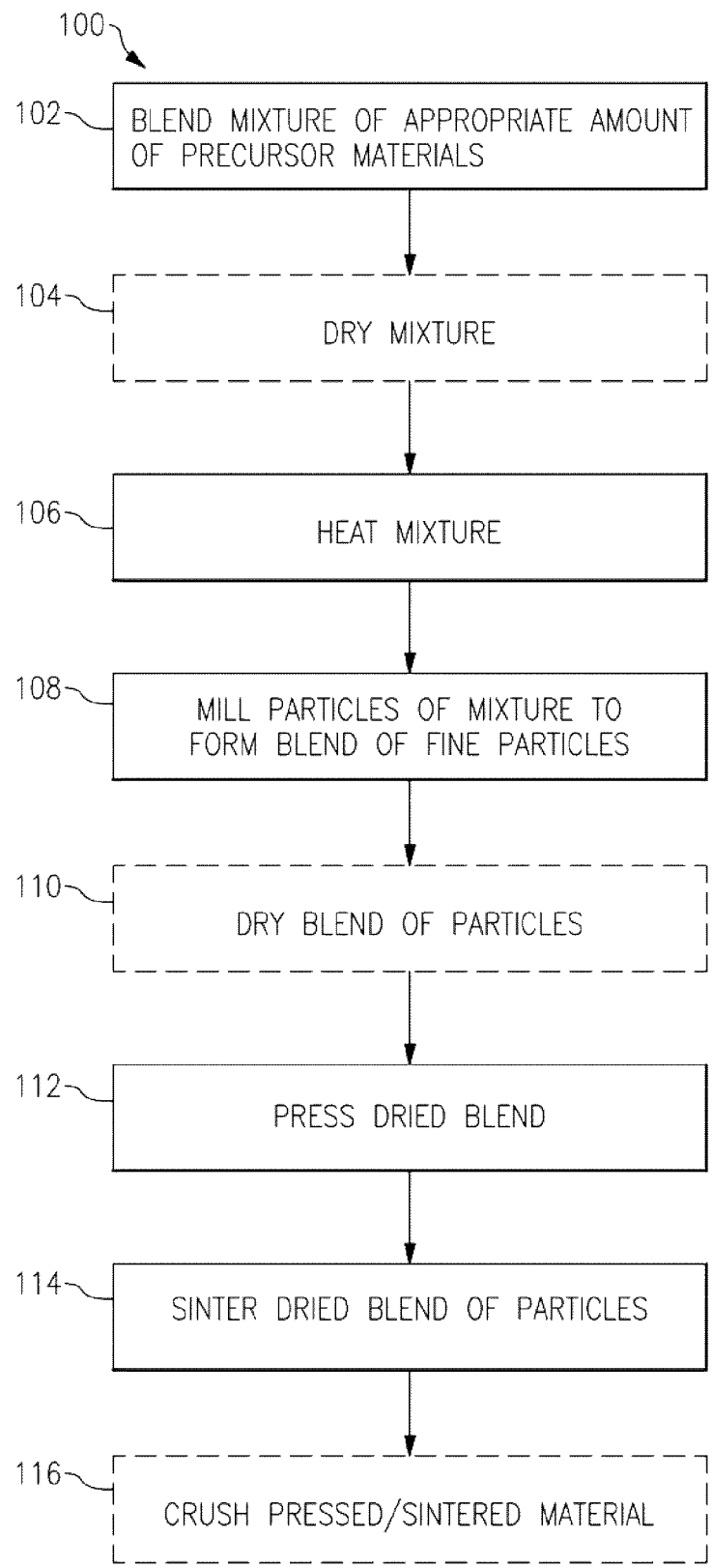
FIG. 2 is a flow chart illustrating a method of forming a hexagonal ferrite material according to one preferred embodiment.

FIG. 2 illustrates a method 100 of forming a $Co_2Z$ material according to a preferred embodiment. As shown in FIG. 2, appropriate amounts of precursor materials—reactants that may provide barium, cobalt, iron, one or more alkali metals, and oxygen that can form the magnetic material—are mixed together in Step 102. In some aspects, at least a portion of the oxygen may be provided in the form of an oxygen-containing compound of barium (Ba), cobalt (Co), iron (Fe), or one or more alkali metals. For example, these elements may be provided in carbonate or oxide forms, or in other oxygen-containing precursor forms known in the art. In one or more aspects, one or more precursor materials may be provided in a non-oxygen-containing compound, or in a pure elemental form. In other aspects, oxygen could be supplied from a separate compound, such as, for example, $H_2O_2$ or from gaseous oxygen or air. For example, in one embodiment, $BaCO_3$, $CO_3O_4$, and $Fe_2O_3$ precursors are mixed in a ratio appropriate for the formation of $CO_2Z$ (for example, about 22 wt. % $BaCO_3$, about 6 wt. % $CO_3O_4$, and about 72 wt. % $Fe_2O_3$) along with between about 0.06 wt. % and about 3.6 wt. % $K_2CO_3$. These precursor compounds may be mixed or blended in water or alcohol using, for example, a Cowles mixer, a ball mill, or a vibratory mill. These precursors may also be blended in a dry form.

The blended mixture may then be dried if necessary in Step 104. The mixture may be dried in any of a number of ways, including, for example, pan drying or spray drying. The dried mixture may then be heated in Step 106 at a temperature and for a period of time to promote calcination. For example, the temperature in the heating system used in heating Step 106 may increase at a rate of between about 20° C. per hour and about 200° C. per hour to achieve a soak temperature of about 1100° C.-1300° C., or about 1100° C. to 1250° C., which may be maintained for about two hours to about twelve hours. The heating system may be, for example, an oven or a kiln. The mixture may experience a loss of moisture, and/or reduction or oxidation of one or more components, and/or the decomposition of carbonates and/or organic compounds which may be present. At least a portion of the mixture may form a hexaferrite solid solution The temperature ramp rate, the soak temperature, and the time for which the mixture is heated may be chosen depending on the requirements for a particular application. For example, if small crystal grains are desired in the material after heating, a faster temperature ramp, and/or lower soak temperature, and/or shorter heating time may be selected as opposed to an application where larger crystal grains are desired. In addition, the use of different amounts and/or forms of precursor materials may result in different requirements for parameters such as temperature ramp rate and soaking temperature and/or time to provide desired characteristics to the post-heated mixture.

After heating, the mixture, which may have formed agglomerated particles of hexaferrite solid solution, may be cooled to room temperature, or to any other temperature that would facilitate further processing. The cooling rate of the heating system may be, for example, 80° C. per hour. In step 108, the agglomerated particles may be milled. Milling may take place in water, in alcohol, in a ball mill, a vibratory mill, or other milling apparatus. In some embodiments, the milling is continued until the median particle diameter of the resulting powdered material is from about one to about four microns, although other particle sizes, for example, from about one to about ten microns in diameter, may be acceptable in some applications. In a preferred embodiment, high energy milling is used to mill the particles to a fine particle size of 0.2 to 0.9 microns in diameter. This particle size may be measured using, for example, a sedigraph or a laser scattering technique. A target median particle size may be selected to provide sufficient surface area of the particles to facilitate sintering in a later step. Particles with a smaller median diameter may be more reactive and more easily sintered than larger particles. In some methods, one or more alkali metals or alkali metal precursors or other dopant materials may be added at this point rather than, or in addition to, in step 102.

The powdered material may be dried if necessary in step 110 and the dried powder may be pressed into a desired shape using, for example, a uniaxial press or an isostatic press in step 112. The pressure used to press the material may be, for example, up to 80,000 N/m, and is typically in the range of from about 20,000 N/m to about 60,000 N/m.sup.2. A higher pressing pressure may result in a more dense material subsequent to further heating than a lower pressing pressure.

In step 114, the pressed powdered material may be sintered to form a solid mass of doped hexaferrite. The solid mass of doped hexaferrite may be sintered in a mold having the shape of a component desired to be formed from the doped hexaferrite. Sintering of the doped hexaferrite may be performed at a suitable or desired temperature and for a time period sufficient to provide one or more desired characteristics, such as, but not limited to, crystal grain size, level of impurities, compressibility, tensile strength, porosity, and in some cases, magnetic permeability. Preferably, the sintering conditions promote one or more desired material characteristics without affecting, or at least with acceptable changes to other undesirable properties. For example, the sintering conditions may promote formation of the sintered doped hexaferrite with little or minimal iron reduction. In one embodiment, the temperature used in the sintering step 114 is preferably between 1100° C. to 1250° C. According to some embodiments, the temperature in the heating system used in the sintering step 114 may be increased at a rate of between about 20° C. per hour and about 200° C. per hour to achieve a soak temperature of about 1150° C.-1450° C. or about 1100° C. to 1150° C. or about 1100° C.-1250° C. which may be maintained for about two hours to about twelve hours. The heating system may be, for example, an oven or a kiln. A slower ramp, and/or higher soak temperature, and/or longer sintering time may result in a more dense sintered material than might be achieved using a faster temperature ramp, and/or lower soak temperature, and/or shorter heating time. Increasing the density of the final sintered material by making adjustments, for example, to the sintering process can be performed to provide a material with a desired magnetic permeability, saturation magnetization, and/or magnetostriction coefficient. According to some embodiments of methods according to the present invention, the density range of the sintered hexaferrite may be between about 4.75 g/cm$^3$ and about 5.36 g/cm$^3$. A desired magnetic permeability of the doped hexaferrite may also be achieved by tailoring the heat treatment of the material to produce grains with desired sizes.

The grain size of material produced by embodiments of the above method may vary from between about five micrometers and one millimeter in diameter depending upon the processing conditions, with even larger grain sizes possible in some aspects of methods according to the present invention. In some aspects, each crystal of the material may comprise a single magnetic domain. Both doped $CO_2Z$ and un-doped $CO_2Z$ may be members of the planar hexaferrite family called ferroxplana, having a Z-type ferrite crystal structure.

Figure 3:
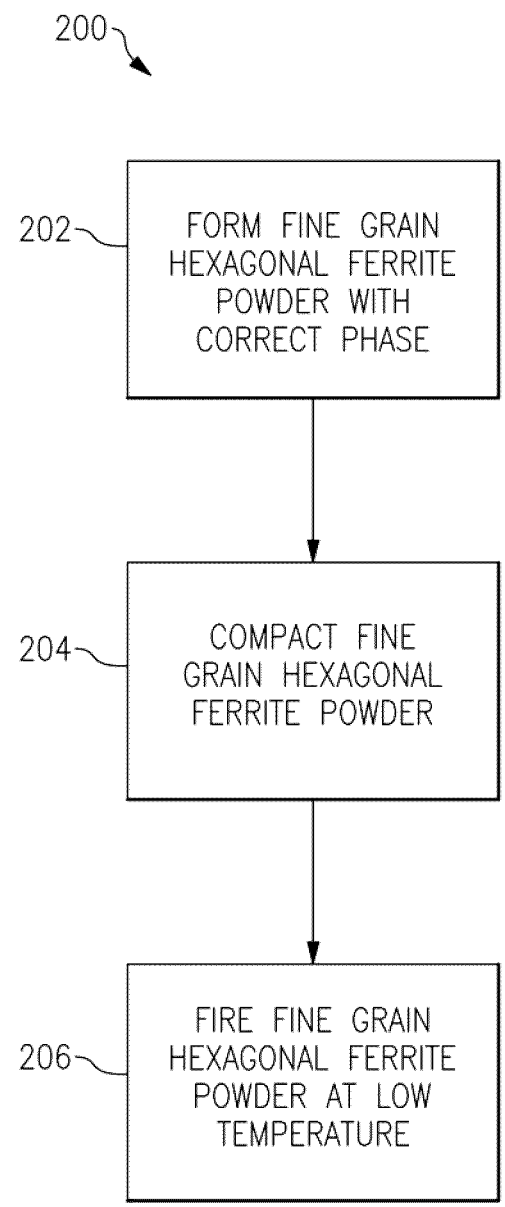
FIG. 3 is a flow chart illustrating a method of forming a hexagonal ferrite material according to another preferred embodiment.

FIG. 3 illustrates a method 200 of forming textured $Co_2Z$ according to another embodiment adapted to reduce the magnetorestriction and improve the resonant frequency of the material. The method 200 begins with step 202 in which a fine grain hexagonal ferrite powder is formed. In one implementation, the fine grain hexagonal ferrite powder is a barium cobalt ferrite Z-phase ($Co_2Z$) powder. The $Co_2Z$ powder can be synthesized using a chemical process known in the art such as co-precipitation. The $Co_2Z$ can also be synthesized via sol-gel, calcining, and mechanical milling using a Netzsch zeta-mill or the like. In one embodiment, the $Co_2Z$ powder has particle sizes of less than about 1 micron and surface areas of greater than about 6 m$^2$/g. In another embodiment, the $Co_2Z$ powder has an average particle size of less than about 1 micron and an average surface area of greater than about 6 m$^2$/g. In a preferred implementation, the $Co_2Z$ powder has a median particle size of between 300-600 nm, and a surface area of greater than about 15 m$^2$/g. It will be appreciated that the hexagonal ferrite powder can also comprise Y, W, U, X, or M phase hexagonal ferrite materials, depending on the application.

As FIG. 3 further shows, the method 200 further comprises step 204 in which the hexagonal ferrite powder is compacted by a known process such as cold isostatic pressing, uniaxial pressing, extrusion, or the like. As also shown in FIG. 3, the hexagonal powder is subsequently fired at a temperature between about 1100° C. to 1250° C., which is lower than the standard, conventional sintering temperature for the same material. The resulting material is preferably a fine grained hexagonal ferrite material.

Figure 4:
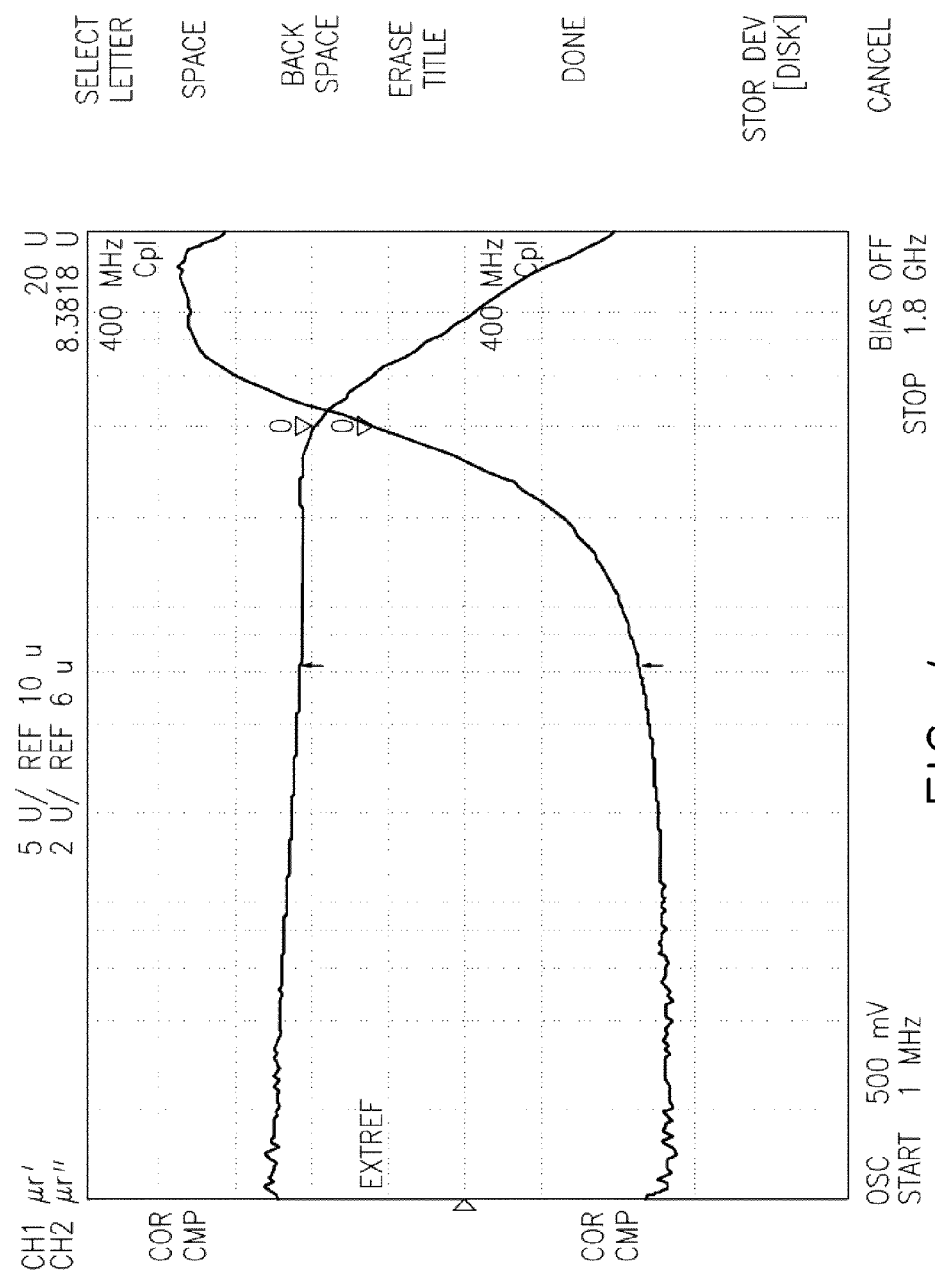
FIG. 4 is an impedance plot illustrating the results of lower resonance peaks achieved when the material is prepared without zeta milling and without low firing.
Figure 5:
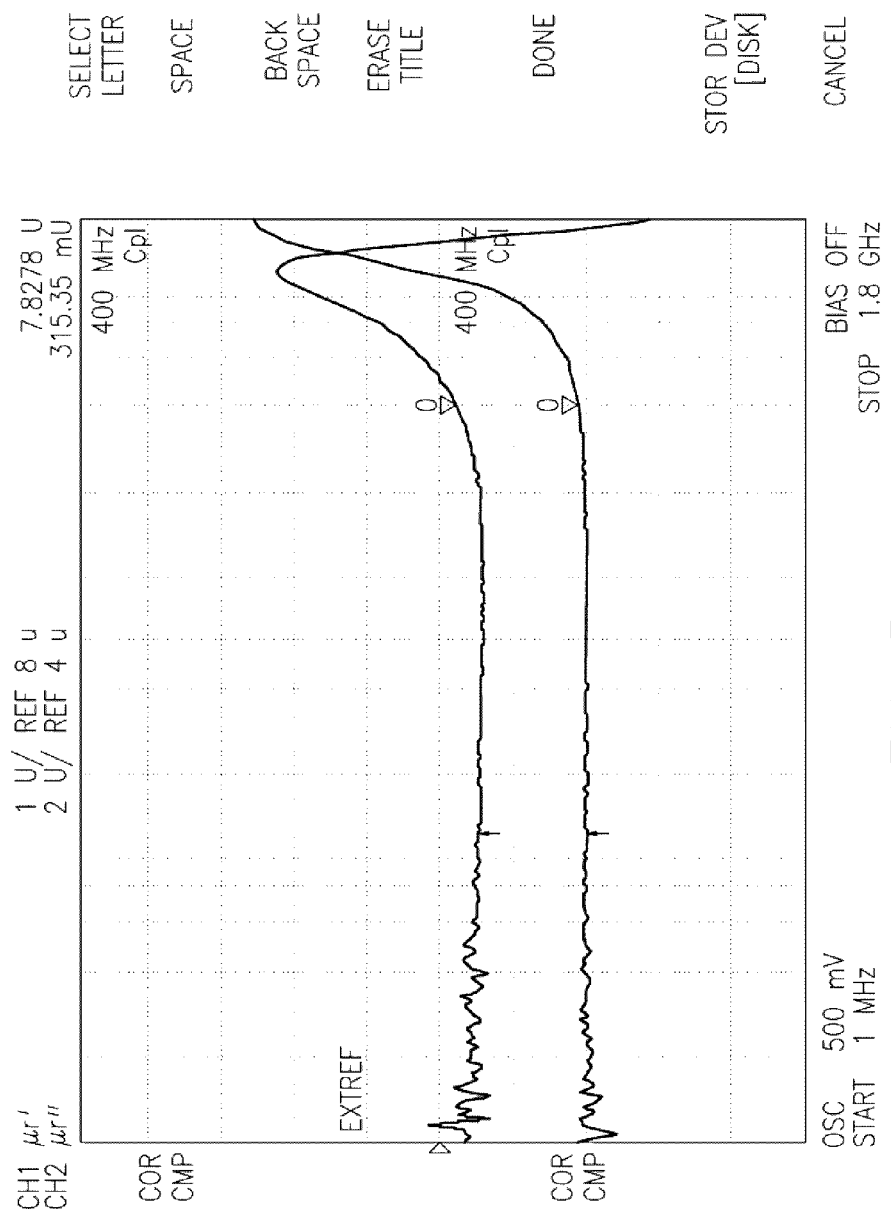
FIG. 5 is an impedance plot illustrating the results of lower resonance peaks achieved when the material is zeta milled and fired at a higher temperature.
Figure 6:
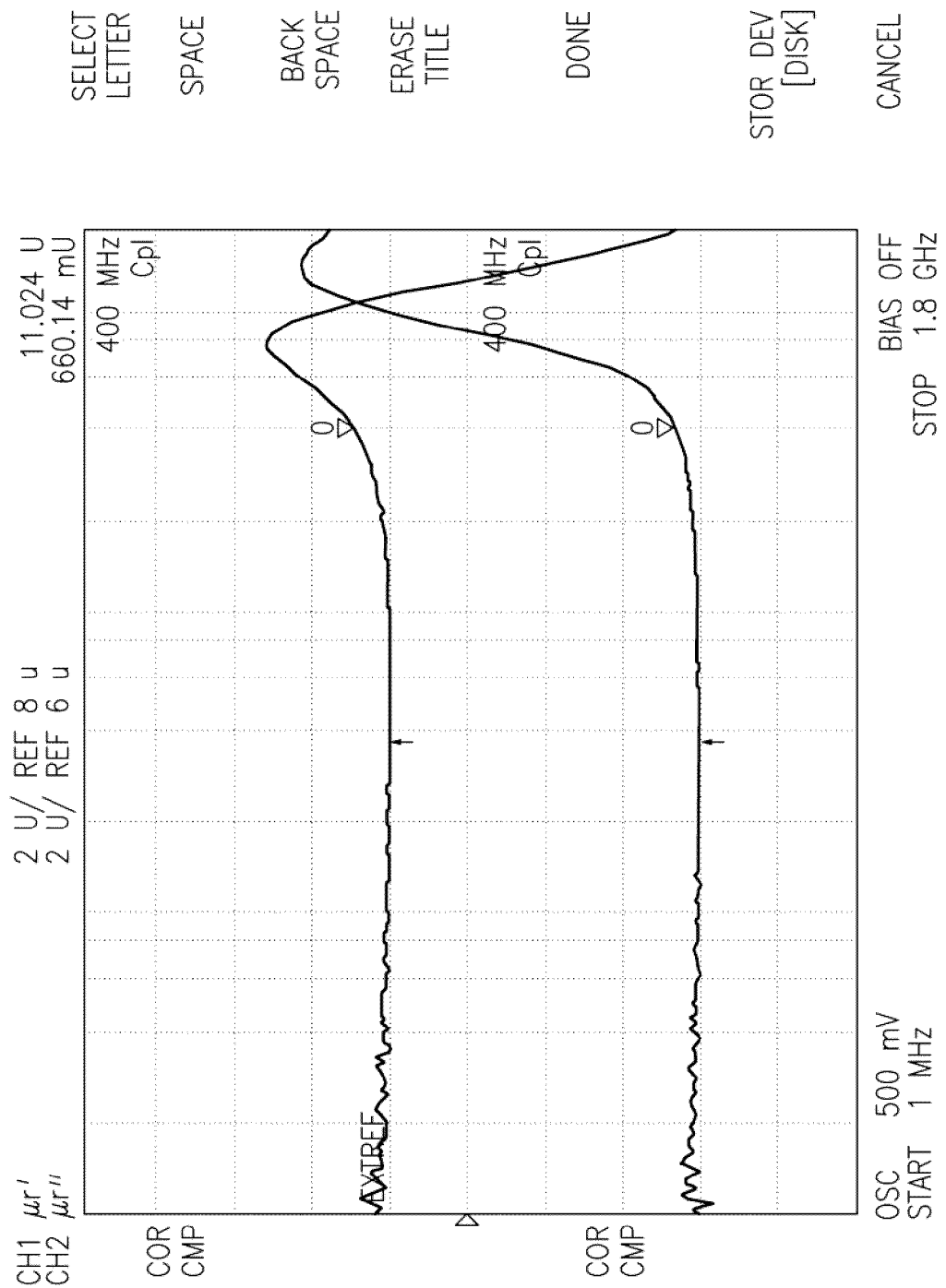
FIG. 6 is an impedance plot illustrating the results of higher resonant peaks achieved using methods of the preferred embodiments to process hexagonal ferrite material.

FIGS. 4-6 illustrate impedance plots showing a $Co_2Z$ powder having a median particle size of about 2-3 microns and processed through a zeta-mill and fired at about 1100° C. and 1140° C. As shown in FIG. 4, the resonant peak, or maximum of the imaginary permeability curve, is shifted to higher frequencies with zeta milling and low firing temperatures. Without wishing to be bound by theory, it is believed that the hexagonal ferrite materials formed by the preferred processing techniques do not have or have very small internal stress field leading to magnetorestriction. The hexagonal ferrite material formed according to methods described herein can be incorporated in a variety of RF devices such as high frequency antennas, inductors, and transformers.

FIGS. 4-6 show the change in the real component of the dimensionless complex relative magnetic permeability, $\mu'$ (referred to herein simply as the magnetic permeability) versus frequency for $CO_2Z$ powder. It can be seen that $CO_2Z$ demonstrates a relatively constant magnetic permeability [at lower frequencies]. At higher frequencies, the material demonstrates a rise in magnetic permeability leading to a peak followed by a rapid drop off as in magnetic permeability as frequency continues to increase. The peak of magnetic permeability will be referred to herein as the "resonant frequency."

FIG. 4 depicts the magnetic permeability of $CO_2Z$ powder with a median particle size of 2-3 microns. FIGS. 5 and 6 depict the magnetic permeability of the same $CO_2Z$ powder that has additionally been zeta-milled then fired at 1140° and 1100°, respectively. A comparison of FIG. 4 with FIGS. 5 and 6 establishes that zeta-milling and firing the $CO_2Z$ powder increases the resonant frequency of the material. Further, a comparison of FIGS. 5 and 6 shows that lowering the firing temperature from 1140° to 1100° leads to a further increase in the resonant frequency of the material. This increase in resonant frequency shows that RF device components made from zeta-milled and low fired $CO_2Z$ may be capable of retaining their magnetic permeability and operating in a frequency range higher than, or in a broader frequency range than that of similar devices or device components made from un-milled and higher-fired $CO_2Z$.

FIGS. 4-6 also illustrate the effect of Zeta-milling and low firing on the imaginary component of the complex relative magnetic permeability, $\mu''$, which corresponds to energy loss in the material at high frequencies. In FIGS. 4-6 it can be observed that maximum of the imaginary permeability curve, the "resonant peak" is shifted to higher frequencies when the $CO_2Z$ material is processed with powder that has been zeta-milled and low fired.

Figure 7:
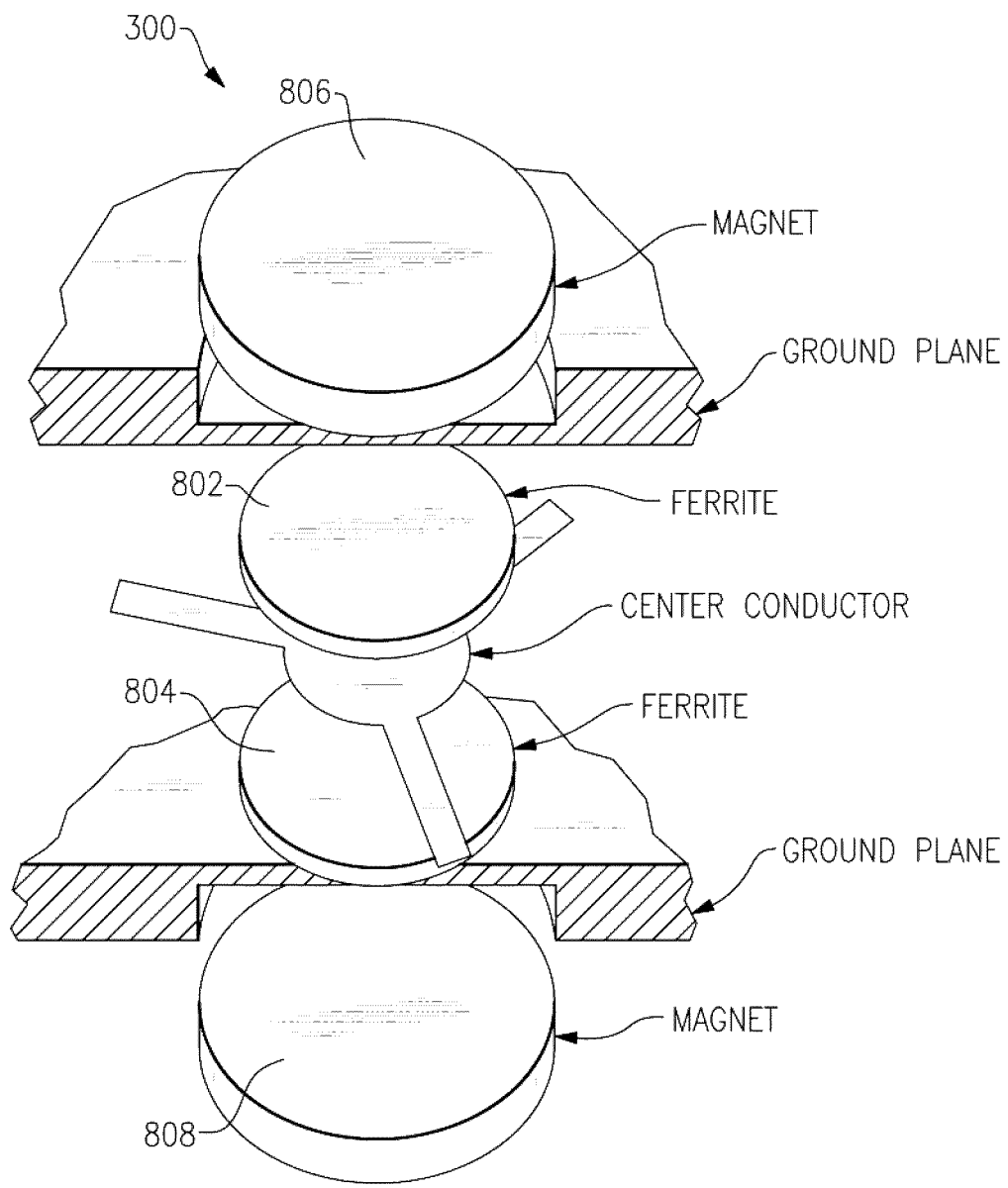
FIG. 7 schematically shows an example of a circulator incorporating an enhanced resonant frequency $Co_2Z$ material formed in accordance with processing techniques of certain embodiments of the present invention.

FIG. 7 schematically shows an example of a circulator 300 incorporating a enhanced resonant frequency $Co_2Z$ material formed in accordance with certain embodiments described herein. As shown in FIG. 7, the circulator 300 has a pair of ferrite disks 802, 804 disposed between a pair of cylindrical magnets 806, 808. The ferrite disks 802, 804 are preferably made of a resonant frequency enhanced $Co_2Z$ material according to certain embodiments of the present invention. The magnets 806, 808 can be arranged so as to yield generally axial field lines through the ferrite disks. Preferably, the ferrite disks have a magnetic resonance linewidth of 11 Oe or less.

Figure 8:
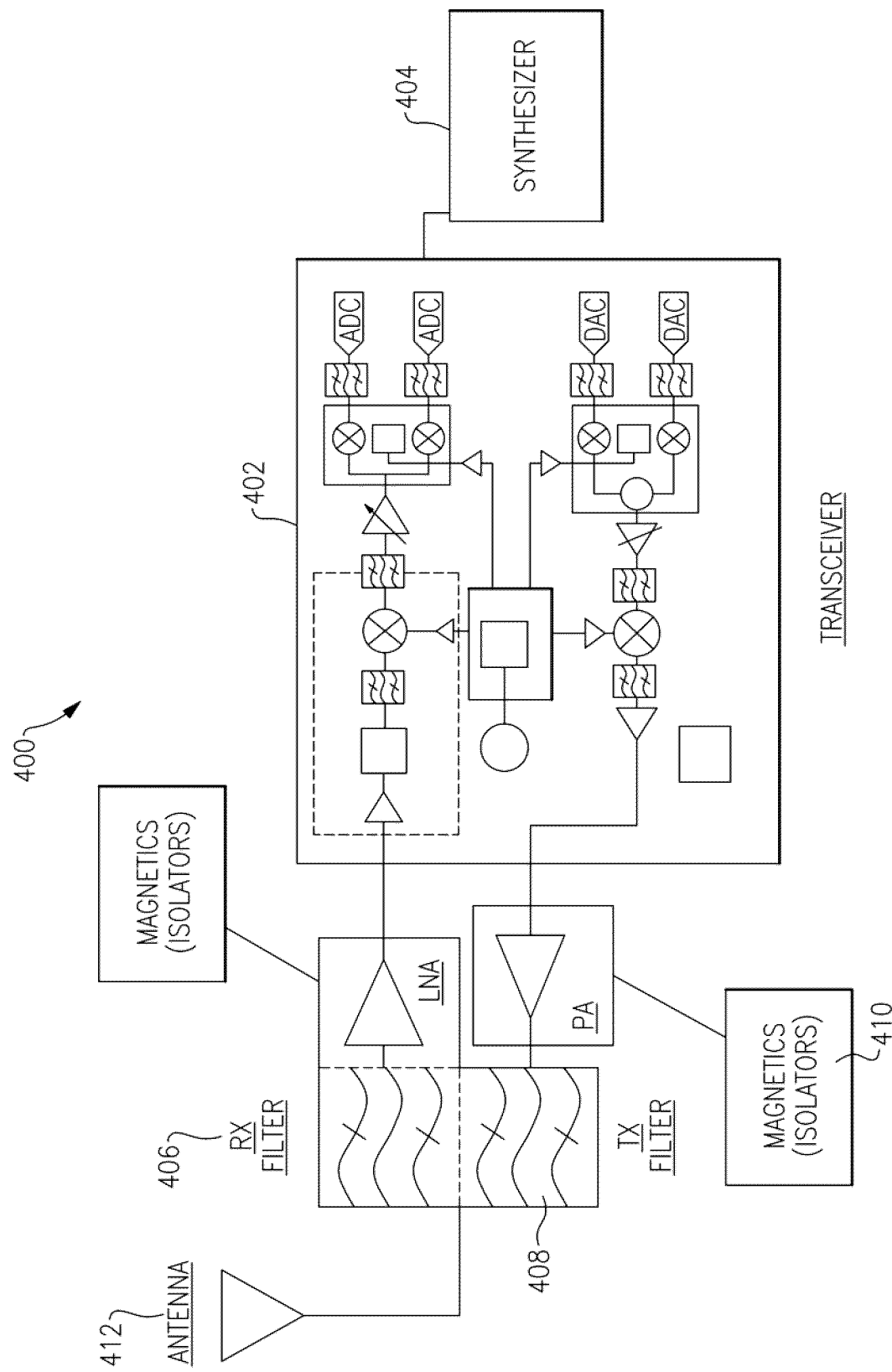
FIG. 8 illustrates a telecommunication base station system incorporating a $Co_2Z$ material formed in accordance with processing techniques of certain embodiments of the present invention.

FIG. 8 illustrates a telecommunication base station system 400 comprising a transceiver 402, a synthesizer 404, an RX filter 406, a TX filter 408, and magnetic isolators 410 and an antenna 412. The magnetic isolators 410 can be incorporated in a single channel PA and connectorized, integrated triplate or microstrip drop-in. In preferred implementations, the magnetic isolators 410 comprise a $Co_2Z$ material made in accordance with certain embodiments described in this disclosure.

Provided herein are various non-limiting examples of composition, materials, and methods of preparing the materials for electronic applications. While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separated from others.

What is claimed is:

1. A radio-frequency telecommunication system having increased resonant frequency comprising:
    a transceiver;
    a synthesizer;
    transmit and receive filters;
    an antenna; and
    at least one magnetic isolator including Z-phase barium cobalt hexagonal ferrite material having the formula $Ba_3Co_2Fe_{24}O_{41}$ formed from fine grain hexagonal ferrite powder having an average particle size of between 300-600 nm and sintered at a temperature between 1100 and 1250° C.

2. The telecommunication system of claim 1 wherein the at least one magnetic isolator comprises a plurality of magnetic isolators.

3. The telecommunication system of claim 2 wherein the plurality of magnetic isolators are incorporated in a single channel power amplifier.

4. The telecommunication system of claim 2 wherein the plurality of magnetic isolators are connectorized, integrated triplate, or microstrip drop-in.

5. The telecommunication system of claim 2 wherein the fine grain hexagonal ferrite powder has a magnetic frequency linewidth of 11 Oe or less.

6. The telecommunication system of claim 1 wherein the fine grain hexagonal ferrite powder has an average surface area of greater than 15 m²/g.

7. The telecommunication system of claim 1 wherein the at least one magnetic isolator absorbs signals at microwave frequencies.

8. The telecommunication system of claim 1 wherein the telecommunication system operates in a frequency ranger higher than or broader than that of a telecommunication system made from higher-temperature fired Z-phase barium cobalt.

9. The telecommunication system of claim 1 wherein sintered fine grain hexagonal powder has a density range of between 4.75 g/cm³ and 5.36 g/cm³.

10. The telecommunication system of claim 1 wherein the fine grain hexagonal ferrite powder has an average surface area of greater than 6 m²/g.

11. A telecommunication base station system, the base station system comprising:
    a transceiver;

a synthesizer;

transmit and receive filters;

an antenna; and at least one magnetic isolator including Z-phase barium cobalt hexagonal ferrite material having the formula $Ba_3Co_2Fe_{24}O_{41}$ formed from fine grain hexagonal ferrite powder having an average particle size of between 300-600 nm and sintered at a temperature between 1100 and 1250° C.

12. The telecommunication base station system of claim 11 comprising a plurality of magnetic isolators.

13. The telecommunication base station system of claim 11 wherein the at least one magnetic isolator is incorporated into a single channel power amplifier.

14. The telecommunication base station system of claim 11 wherein the at least one magnetic isolator absorbs signals at microwave frequencies.

15. The telecommunication base station system of claim 11 wherein the at least one magnetic isolator is connectorized, integrated triplate, or microstrip drop-in.

16. The telecommunication base station system of claim 11 wherein the fine grain hexagonal ferrite powder has an average surface area of greater than 15 $m^2/g$.

17. A radio-frequency system having high resonant frequency, the system comprising:

at least one filter;

a transceiver; and at least one magnetic isolator including Z-phase barium cobalt hexagonal ferrite material having the formula $Ba_3Co_2Fe_{24}O_{41}$ formed from fine grain hexagonal ferrite powder having an average particle size of between 300-600 nm and sintered at a temperature between 1100 and 1250° C.

18. The radio-frequency system of claim 17 wherein the system is used for telecommunication.

19. The radio-frequency system of claim 17 further comprising a synthesizer.

20. The radio-frequency system of claim 17 wherein the fine grain hexagonal ferrite powder has an average surface area of greater than 15 $m^2/g$.

* * * * *